(12) United States Patent
Converse

(10) Patent No.: US 9,360,377 B2
(45) Date of Patent: Jun. 7, 2016

(54) NON-INTRUSIVE TEMPERATURE MEASUREMENT ASSEMBLY

(71) Applicant: Rosemount Inc., Chanhassen, MN (US)

(72) Inventor: Pat Dodson Converse, Minnetrista, MN (US)

(73) Assignee: Rosemount Inc., Chanhassen, MN (US)

( * ) Notice: Subject to any disclaimer, the term of this patent is extended or adjusted under 35 U.S.C. 154(b) by 295 days.

(21) Appl. No.: 14/140,784

(22) Filed: Dec. 26, 2013

(65) Prior Publication Data

US 2015/0185085 A1     Jul. 2, 2015

(51) Int. Cl.
  *G01K 1/14*     (2006.01)
  *G01K 3/14*     (2006.01)
  *G01K 13/00*    (2006.01)
  *G01K 7/42*     (2006.01)

(52) U.S. Cl.
  CPC *G01K 1/143* (2013.01); *G01K 3/14* (2013.01); *G01K 7/427* (2013.01); *G01K 13/00* (2013.01)

(58) Field of Classification Search
  USPC ......... 374/208, 141, 144, 147, 179, 166, 110, 374/44, 112, 163
  See application file for complete search history.

(56) References Cited

U.S. PATENT DOCUMENTS

| | | | | |
|---|---|---|---|---|
| 3,724,267 A * | 4/1973 | Zoschak | ............... | G01K 17/00 165/11.1 |
| 4,186,605 A * | 2/1980 | Bourigault | ............... | G01K 3/06 374/115 |
| 4,384,793 A * | 5/1983 | O'Brien | ................... | G01K 7/18 374/115 |
| 4,436,438 A * | 3/1984 | Voznick | .................. | G01K 7/18 324/720 |
| 4,488,516 A * | 12/1984 | Bueters | ................... | F22B 37/48 110/185 |
| 4,527,908 A * | 7/1985 | Arisi | ..................... | G01K 17/06 122/448.1 |
| 4,722,610 A * | 2/1988 | Levert | .................... | F28G 15/00 110/185 |
| 4,826,540 A * | 5/1989 | Mele | ....................... | G01K 1/14 136/221 |
| 5,064,604 A * | 11/1991 | Barton | ................ | G21C 17/032 376/245 |
| 5,743,646 A | 4/1998 | O'Connell et al. | | |
| 6,485,174 B1 * | 11/2002 | Albrecht | ............... | G01K 17/08 374/147 |
| 6,503,221 B1 | 1/2003 | Briggs et al. | | |

(Continued)

FOREIGN PATENT DOCUMENTS

WO     91/14161     9/1991

OTHER PUBLICATIONS

International Searching Authority, International Search Report and Written Opinion, Feb. 27, 2015, 10 pages.

(Continued)

*Primary Examiner* — Lisa Caputo
*Assistant Examiner* — Tran M Tran
(74) *Attorney, Agent, or Firm* — Kinney & Lange, P.A.

(57) ABSTRACT

A temperature sensor assembly for use with a process vessel wall includes a base structure, a first temperature sensor, a second temperature sensor, and a processor. The base structure forms a contact area with an external surface of the process vessel wall. The first temperature sensor extends through the base structure to measure a temperature of the external surface of the process vessel wall. The second temperature sensor is at a second surface spaced from the first surface to measure a temperature of the second surface of the base structure. The processor is connected to the first and second temperature sensors, and adapted to determine an internal process vessel wall temperature value as a function of the measured temperature of the external surface of the process vessel wall, the measured temperature of the second surface of the base structure, base structure parameters, and process vessel wall parameters.

21 Claims, 4 Drawing Sheets

(56) References Cited

U.S. PATENT DOCUMENTS

| | | | | |
|---|---|---|---|---|
| 6,824,305 B1* | 11/2004 | Boyd | | G01K 17/00 374/15 |
| 6,848,373 B2* | 2/2005 | Breen | | F28D 7/0041 110/185 |
| 7,220,050 B2* | 5/2007 | Esprimont | | G01K 17/20 374/29 |
| 7,249,883 B2* | 7/2007 | Kuroda | | G01K 1/165 374/110 |
| 7,249,885 B2* | 7/2007 | Van Den Ende | | F28F 27/00 374/147 |
| 7,395,173 B2* | 7/2008 | Kautz | | G01K 7/42 374/124 |
| 7,789,554 B2* | 9/2010 | Sattler | | G01K 1/16 374/110 |
| 8,057,093 B2* | 11/2011 | Sattler | | G01K 1/16 374/100 |
| 8,092,085 B2* | 1/2012 | Kawase | | G01K 7/223 374/183 |
| 8,280,674 B2* | 10/2012 | Schwerer | | G01K 7/42 374/137 |
| 8,591,102 B2* | 11/2013 | Frach | | G01K 17/20 374/112 |
| 8,671,890 B2* | 3/2014 | Davidson | | 122/511 |
| 8,851,745 B2* | 10/2014 | Sakami | | G01N 25/64 374/145 |
| 2006/0050767 A1 | 3/2006 | Fleming | | |
| 2008/0083446 A1 | 4/2008 | Chakraborty et al. | | |
| 2009/0110023 A1 | 4/2009 | Clark, Jr. et al. | | |
| 2010/0246630 A1 | 9/2010 | Kaszynski et al. | | |
| 2010/0316086 A1 | 12/2010 | Engelstad et al. | | |
| 2012/0128024 A1* | 5/2012 | Tsuchida | | G01K 13/002 374/29 |

OTHER PUBLICATIONS

Product Sheet, Rosemoutt 0085 Pipe Clamp Sensor, Emerson Process Management, Jul. 2013, 00813-0100-4952, Rev DE, pp. 1-12.

* cited by examiner

NON-INTRUSIVE TEMPERATURE MEASUREMENT ASSEMBLY

BACKGROUND

The present invention relates generally to temperature measuring assemblies for use with industrial processes. In particular, this invention relates to temperature measurement assemblies for non-intrusive process temperature measurement.

Non-intrusive industrial process temperature measurement assemblies may be used to measure a temperature of a process fluid within a vessel without the need to penetrate a process vessel wall. A non-intrusive temperature measurement assembly measures the temperature of the vessel wall exterior. Such an assembly may include a temperature sensor and a structure adapted to position a temperature sensing probe tip of the temperature sensor on an exterior surface of the vessel wall. As the process fluid temperature changes, the vessel wall temperature will also change. The vessel wall temperature will also change in response to ambient conditions, such as sunlight, wind, or rain. Insulation around the probe tip provides some shielding of the exterior surface from changes in ambient conditions. However, to the extent the insulation is less than ideal, the accuracy of non-intrusive process temperature measurements is impaired.

SUMMARY

An embodiment of the present invention is a temperature sensor assembly for use with a process vessel wall, the assembly including a base structure, a first temperature sensor, a second temperature sensor, and a processor. The base structure includes a first surface adapted to form a contact area with a portion of an external surface of the process vessel wall, and a second surface spaced from the first surface. The first temperature sensor extends through the base structure at the contact area to measure a temperature of the external surface of the process vessel wall. The second temperature sensor is at the second surface of the base structure to measure a temperature of the second surface of the base structure. The processor is connected to the first temperature sensor and the second temperature sensor, and adapted to determine an internal process vessel wall temperature value as a function of the measured temperature of the external surface of the process vessel wall, the measured temperature of the second surface of the base structure, base structure parameters, and process vessel wall parameters.

Another embodiment of the present invention is a temperature measurement assembly for use with a process vessel wall, the assembly including a temperature sensor assembly and an electronics housing connected to the temperature sensor assembly. The temperature sensor assembly includes a base structure, a first temperature sensor, and a second temperature sensor. The base structure includes a first surface adapted to form a contact area with a portion of an external surface of the process vessel wall, and a second surface spaced from the first surface. The first temperature sensor extends through the base structure at the contact area to measure a temperature of the external surface of the process vessel wall. The second temperature sensor is at the second surface of the base structure to measure a temperature of the second surface of the base structure. The electronics housing includes a processor and a communications interface. The processor is connected to the first temperature sensor and the second temperature sensor and adapted to determine an internal process vessel wall temperature value as a function of the measured temperature of the external surface of the process vessel wall, the measured temperature of the second surface of the base structure, base structure parameters, and process vessel wall parameters. The communication interface is adapted to transmit the internal process vessel wall temperature value to a control or monitoring system Yet another embodiment of the present invention is a method of non-intrusively determining an internal process vessel wall temperature value. The method includes covering a portion of an external surface of a process vessel wall with a base structure. The method includes measuring a temperature of the external surface of the process vessel wall, and measuring a temperature of a surface of the base structure, the surface facing away from the process vessel wall. The method also includes determining the internal process vessel wall temperature value based on the measured temperature of the external surface of the process vessel wall, the measured temperature of the surface of the base structure, base structure parameters, and process vessel wall parameters.

DETAILED DESCRIPTION

Figure 1:
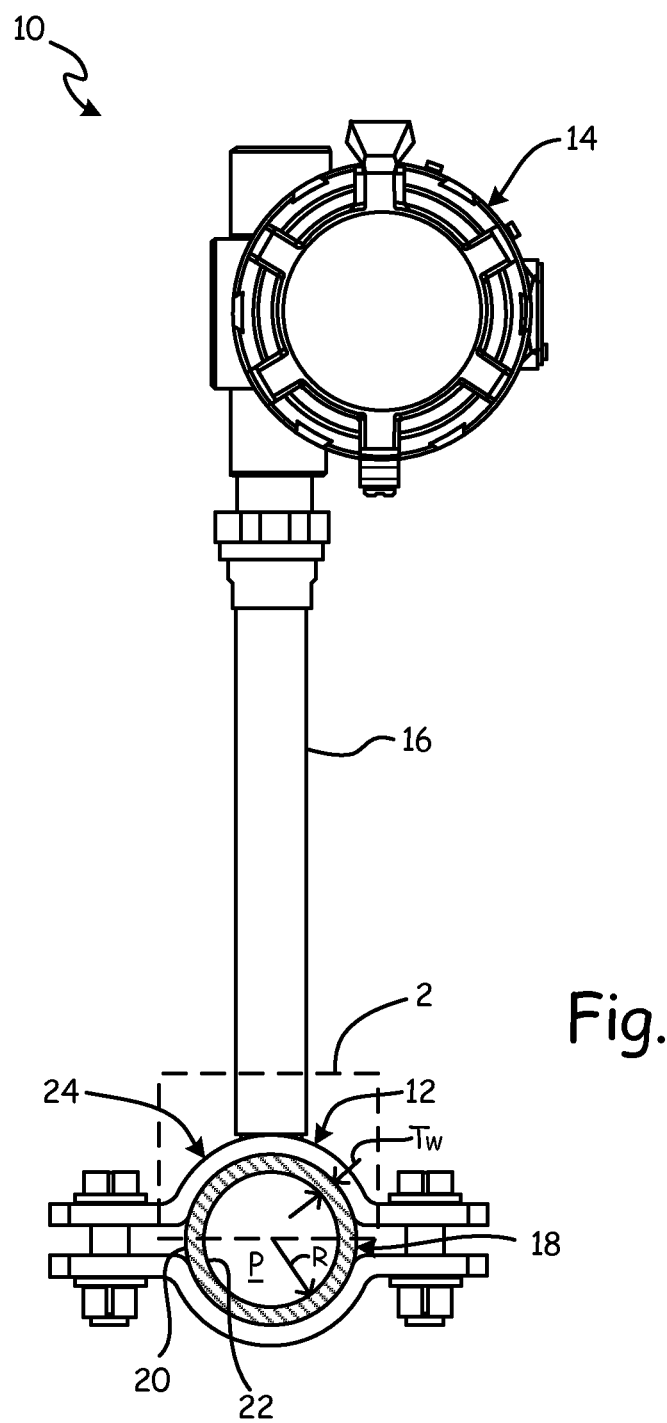
FIG. 1 is a side view of a temperature measurement assembly embodying the present invention wherein a base structure is a pipe clamp.

FIG. 1 is a side view of a temperature measurement assembly embodying the present invention. FIG. 1 shows temperature measurement assembly 10 including temperature sensor assembly 12, electronics housing 14, and sensor tube 16. Temperature measurement assembly 10 is attached to process vessel wall 18 for measuring a temperature associated with process fluid P contained within process vessel wall 18. In the embodiment shown in FIG. 1, process vessel wall 18 forms a pipe having an internal radius R. Process vessel wall 18 includes external surface 20 and internal surface 22, and process vessel wall thickness $T_W$. Temperature sensor assembly 12 includes base structure 24. Base structure 24 may be a curved plate, such as a pipe clamp, as shown. Temperature sensor assembly 12 is attached process vessel wall 18 at external surface 20 by base structure 24. Sensor tube 16 connects electronics housing 14 to temperature assembly 12 at base structure 24.

Figure 2:
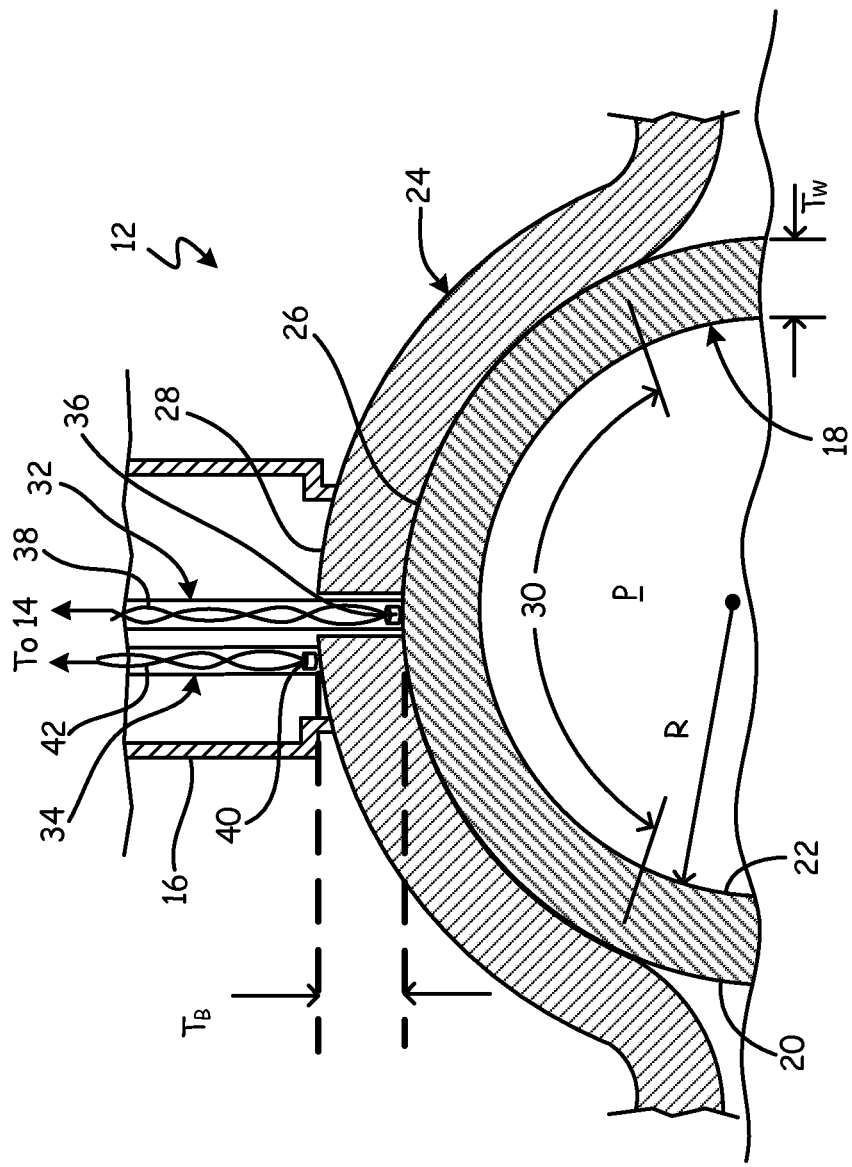
FIG. 2 is a cross-sectional view of a portion of the embodiment of FIG. 1.

FIG. 2 is a cross-sectional view of a portion of the embodiment of FIG. 1. As shown in FIG. 2, base structure 24 includes first surface 26 and second surface 28 spaced from first surface 26 by base structure thickness $T_B$. First surface 26 is adapted to be in physical contact with a portion of external surface 20 of process vessel wall 18, forming contact area 30. Temperature sensor assembly 12 further includes first temperature sensor 32, and second temperature sensor 34. First temperature sensor 32 includes temperature sensing device 36 and sensor wires 38. Second temperature sensor 34 includes temperature sensing device 40 and sensor wires 42. Temperature sensing device 36 and temperature sensing device 40 may be, for example, a thermocouple, a thermistor, an infrared sensor, or a resistance temperature detector (RTD)

having thin-film or wire-wound elements. Sensor tube 16 is hollow and provides an enclosure for first temperature sensor 32 and second temperature sensor 34. Sensor wires 38 extend through sensor tube 16 to connect temperature sensing device 36 to electronics in electrical housing 14, as discussed in reference to FIG. 3. Similarly, sensor wires 42 extend through sensor tube 16 to connect temperature sensing device 40 to electronics in electrical housing 14.

First temperature sensor 32 extends through base structure 24 at contact area 30, such that first temperature sensor 32 is in physical contact with external surface 20 of process vessel wall 18. So disposed, first temperature sensor 32 measures temperature $\Theta_W$ of external surface 20 by generating an analog electrical signal between sensor wires 38 that varies in response to changes in temperature $\Theta_W$ of external surface 20, as sensed by temperature sensing device 36. Second temperature sensor 34 is in physical contact with second surface 28 of base structure 24 to measure temperature $\Theta_B$ of second surface 28. Second temperature sensor 34 measures temperature $\Theta_B$ of second surface 28 by generating an analog electrical signal between sensor wires 42 that varies in response to changes in temperature $\Theta_B$ of second surface 28, as sensed by temperature sensing device 40.

Figure 3:
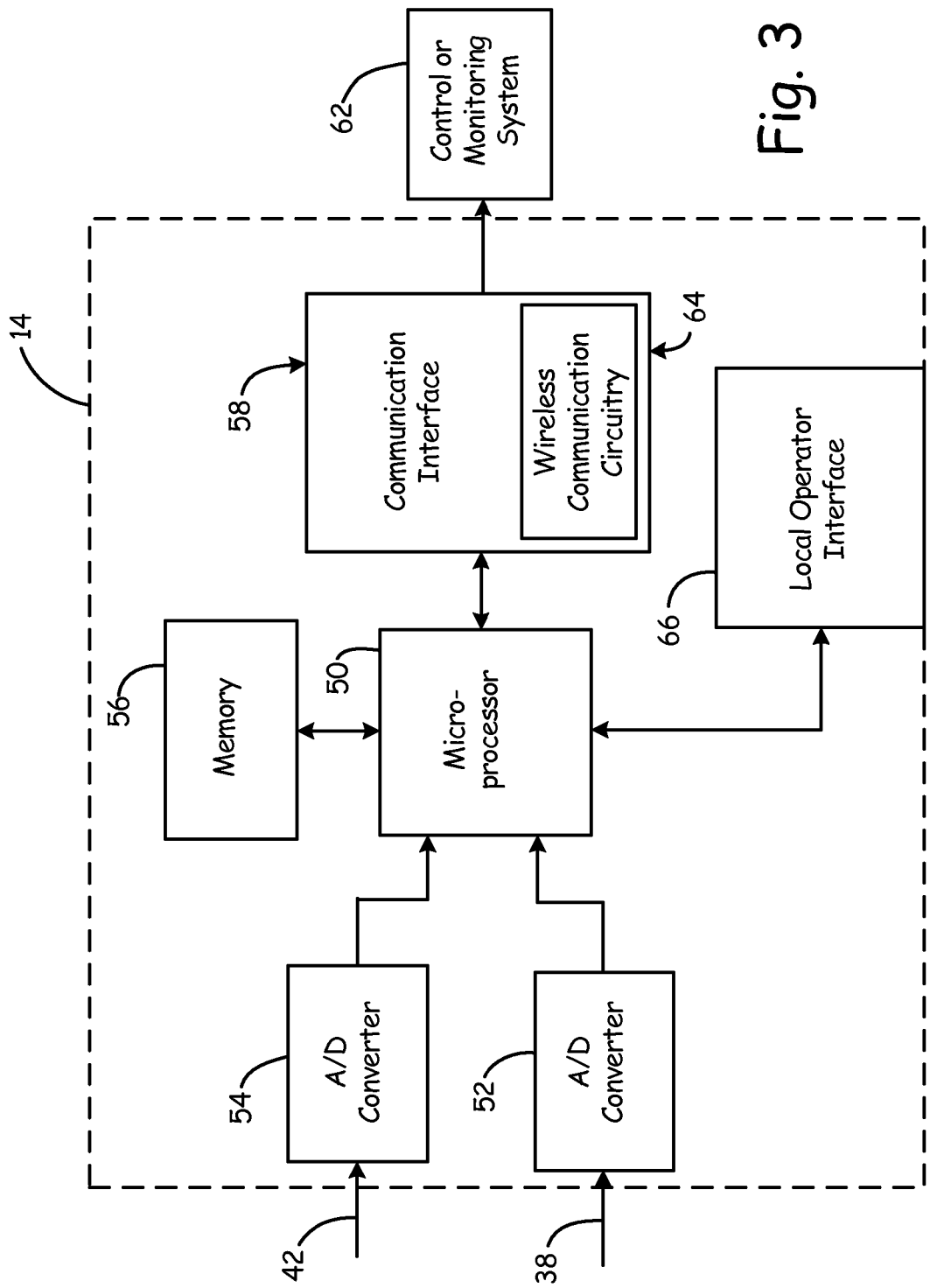
FIG. 3 is a schematic drawing of electronics for the embodiment of FIG. 1.

FIG. 3 is a schematic drawing of electronics for the embodiment of FIGS. 1 and 2. FIG. 2 shows that electronics housing 14 includes processor 50, first A/D converter 52, second A/D converter 54, and memory 56. Processor 50 is preferably a digital microprocessor. First A/D converter 52 and second A/D converter 54 are analog-to-digital converters. Memory 56 is a digital data storage device electrically connected to processor 50. Processor 50 is connected to first temperature sensor 32 by first A/D converter 52. First A/D converter 52 is electrically connected to sensor wires 38 to convert the analog electrical signal from sensing device 36 to a digital signal for processor 50. Second A/D converter 54 connects processor 50 to second temperature sensor 34. Second A/D converter 54 is electrically connected to sensor wires 42 to convert the analog electrical signal from sensing device 40 to a digital signal for processor 50.

Memory 56 contains base structure parameters and process vessel wall parameters. Base structure parameters are physical characteristics of base structure 24 and may include, for example, thermal conductivity value $K_B$ of base structure 24, and base structure thickness $T_B$. The base structure parameters may be stored in memory 56 when temperature measurement assembly 10 is manufactured. Alternatively, the base structure parameters may be stored in memory 56 when temperature measurement assembly 10 is configured for use, as described below.

Process vessel wall parameters are physical characteristics of process vessel wall 18 and include, for example, thermal conductivity value $K_W$ of process vessel wall 18, and process vessel wall thickness $T_W$. Process vessel wall parameters may be stored in memory 56 when temperature measurement assembly 10 is manufactured. However, because it is unlikely that at the time of manufacture the process vessel to which temperature measurement assembly 10 will be attached is known, the process vessel wall parameters may be stored in memory 56 when temperature measurement assembly 10 is configured for use, as described below. Alternatively, or in addition, many sets of process vessel wall parameters may be stored in memory 56 and a desired set within memory 56 selected for use when temperature measurement assembly 10 is configured for use.

According to Fourier's Conduction Law, heat flux through base structure 24 should be the same as through process vessel wall 18. Under this condition, temperature $\Theta_P$ of internal surface 22 of process vessel wall 18 may be determined from the measured temperature $\Theta_W$ of external surface 20, and the measured temperature $\Theta_B$ of second surface 28.

Considering FIGS. 1, 2, and 3 together, temperature measurement assembly 10 is attached to process vessel wall 18 for determining temperature $\Theta_P$ of internal surface 22 of process vessel wall 18 in a non-intrusive manner. Temperature sensor assembly 12 is installed such that first surface 26 of base structure 24 covers a portion of external surface 20, forming contact area 30. Temperature sensor 32 measures temperature $\Theta_W$ of external surface 20, and temperature sensor 34 measures temperature $\Theta_B$ of second surface 28 of base structure 24, which faces away from process vessel wall 18. Processor 50 receives the measured temperature $\Theta_W$ of external surface 20 as digital signals from first A/D converter 52, and the measured temperature $\Theta_B$ of second surface 28 as digital signals from second A/D converter 54. Processor 50 obtains base structure parameters and process vessel wall parameters from memory 36. Using a heat transfer model, such as Fourier's Conduction Law, processor 50 is adapted to determine temperature $\Theta_P$ based on the measured temperature $\Theta_W$ of external surface 20, the measured temperature $\Theta_B$ of second surface 28, the base structure parameters, and the process vessel wall parameters. Temperature $\Theta_P$ is a temperature value of internal surface 22 of process vessel wall 18. Temperature $\Theta_P$ is also an estimate of a temperature of process fluid P within process vessel wall 18. Under turbulent flow conditions, temperature $\Theta_P$ may be a very accurate estimate of process fluid P due a relatively uniform temperature profile across the pipe defined by process vessel wall 18.

In the embodiment shown in FIG. 3, electrical housing 14 may also include communication interface 58. Communication interface 58 provides communication between temperature measurement assembly 10 and control or monitoring system 62. So equipped, temperature measurement assembly 10 may also be referred to as a temperature measurement transmitter, and may transmit temperature $\Theta_P$ of internal surface 22 of process vessel wall 18 to control or monitoring system 62. Communication between temperature measurement assembly 10 and control or monitoring system 62 can be through any suitable wireless or hard-wired connection. For example, communication may be represented by an analog current over a two-wire loop that ranges from 4 to 20 mA. Alternatively, the communication may be transmitted in a digital form over a two-wire loop using the HART digital protocol, or over a communication bus using a digital protocol such as Foundation fieldbus. Communication interface 58 may optionally include wireless communication circuitry 64 for communication by wireless transmission using a wireless protocol such as WirelessHART (IEC 62591). Moreover, communication with control or monitoring system 62 can be direct or through a network of any number of intermediate devices, for example, a wireless mesh network (not shown). Communication interface 58 can help manage and control communication to and from temperature measurement assembly 10. For example, control or monitoring system 62 may provide for configuration of temperature measurement assembly 10, including entering or selecting base structure parameters, process vessel wall parameters, or selecting a heat transfer model for a particular application, by way of communication interface 58.

The embodiment shown in FIG. 3 may also include local operator interface (LOI) 66. LOI 66 may be provided to display temperature $\Theta_P$ of internal surface 22, as well as the measured temperature $\Theta_W$ of external surface 20, the measured temperature $\Theta_B$ of second surface 28, the base structure parameters, and the process vessel wall parameters. LOI 66 may also be provided to allow configuration of temperature measurement assembly 10, including entering or selecting base structure parameters, process vessel wall parameters, or selecting a heat transfer model for a particular application.

In the embodiment shown in FIGS. 1, 2, and 3, a heat transfer model for a pipe having internal radius R may be employed:

$$\Theta_P = \Theta_W + \left[\frac{K_B \ln\left(\frac{R+T_W}{R}\right)}{K_W \ln\left(\frac{R+T_B+T_W}{R+T_W}\right)}\right](\Theta_W - \Theta_B). \quad [1]$$

Base structure parameters include thermal conductivity value $K_B$ of base structure 24, and base structure thickness $T_B$. Process vessel wall parameters include thermal conductivity value $K_W$ of process vessel wall 18, and process vessel wall thickness $T_W$. Thus, processor 50 may employ the heat transfer model of Eq. [1] to determine temperature $\Theta_P$ of internal surface 22 of process vessel wall 18 based on the measured temperature $\Theta_W$ of external surface 20, the measured temperature $\Theta_B$ of second surface 28, the base structure parameters, and the process vessel wall parameters.

Figure 4:
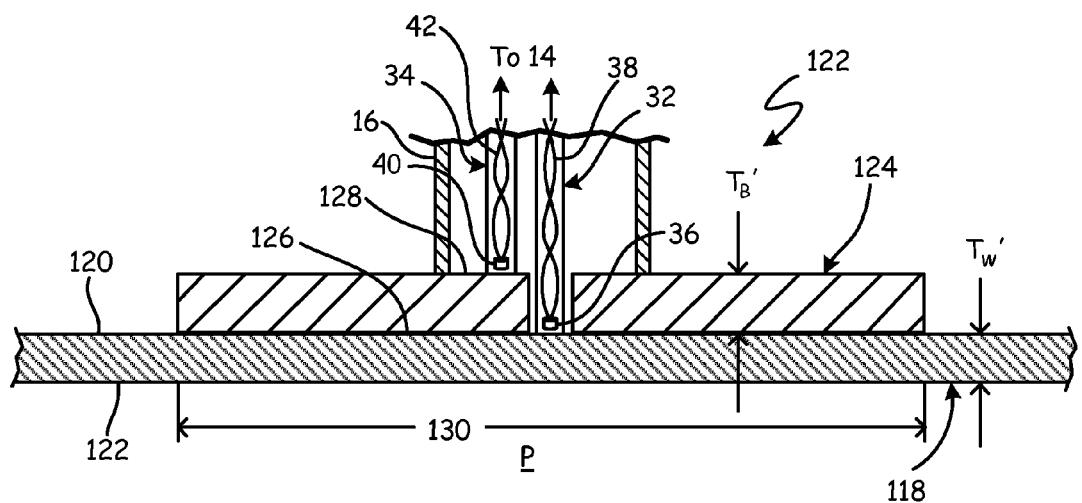
FIG. 4 is a cross-sectional view of a portion of another embodiment of a temperature measurement assembly embodying the present invention in which the base structure is a flat plate.

FIG. 4 is cross-sectional view of a portion of another embodiment of a temperature measurement assembly embodying the present invention wherein base structure is a flat plate. The embodiment may be employed for a flat-sided process vessel, for example, a furnace or a process tank having a flat side. This embodiment may also be employed for a pipe or round process tank having an internal radius R so large that the process vessel wall approaches a flat surface over a distance covered by the base structure.

The embodiment of FIG. 4 is identical to that described above in reference to FIGS. 1, 2, and 3, except that base structure 24 of temperatures sensor assembly 12 is replaced by base structure 124 to accommodate process vessel wall 118. Process vessel wall 118 is a flat wall including external surface 120 and internal surface 122, and process vessel wall thickness $T_W'$. Temperature sensor assembly 12 is attached process vessel wall 118 at external surface 120 by base structure 124. Sensor tube 16 connects electronics housing 14 (FIG. 1) to temperature assembly 12 at base structure 124.

Base structure 124 includes first surface 126 and second surface 128 spaced from first surface 126 by base structure thickness $T_B'$. First surface 126 is adapted to be in physical contact with a portion of external surface 120 of process vessel wall 118, forming contact area 130. First temperature sensor 32 extends through base structure 124 at contact area 130, such that first temperature sensor 32 is in physical contact with external surface 120 of process vessel wall 118. So disposed, first temperature sensor 32 measures temperature $\Theta_W'$ of external surface 120. Second temperature sensor 34 is in physical contact with second surface 128 of base structure 124 to measure temperature $\Theta_B'$ of second surface 128.

As with the embodiment described above in reference to FIGS. 1, 2, and 3, processor 50 obtains base structure parameters and process vessel wall parameters from memory 36. Using a heat transfer model, such as Fourier's Conduction Law, processor 50 is adapted to determine temperature $\Theta_P'$ of internal surface 122 of process vessel wall 118 based on the measured temperature $\Theta_W'$ of external surface 120, the measured temperature $\Theta_B'$ of second surface 128, the base structure parameters, and the process vessel wall parameters.

In the embodiment shown in FIG. 4, a heat transfer model for a flat surface may be employed:

$$\Theta_P' = \Theta_W' + \left[\frac{K_B' T_W'}{K_W' T_B'}\right](\Theta_W' - \Theta_B'). \quad [2]$$

Base structure parameters include thermal conductivity value $K_B'$ of base structure 124, and base structure thickness $T_B'$. Process vessel wall parameters include thermal conductivity value $K_W'$ of process vessel wall 118, and process vessel wall thickness $T_W'$. Thus, processor 50 may employ the heat transfer model of Eq. [2] to determines temperature $\Theta_P'$ of internal surface 122 of process vessel wall 118 based on the measured temperature $\Theta_W'$ of external surface 120, the measured temperature $\Theta_B'$ of second surface 128, the base structure parameters, and the process vessel wall parameters.

Embodiments of the present invention overcome the problem of non-intrusively measuring a temperature of a process fluid within a vessel wall by employing two temperature sensors separated by a thickness of a base structure attached to the vessel wall, and a processor producing a temperature value of the internal vessel wall as a function of measurements from the two temperature sensors, parameters of the base structure, and parameters of the process vessel wall. In this way, common mode effects, including ambient conditions, such as sunlight, wind, or rain, can be at least partially compensated, improving the accuracy of the temperature value produced.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature sensor assembly for use with a process vessel wall, the assembly comprising: a base structure including: a first surface adapted to form a contact area with a portion of an external surface of the process vessel wall, and a second surface spaced from the first surface by a thickness of the base a first temperature sensor extending through the base structure at the contact area to measure a temperature of the external surface of the process vessel wall; a second temperature sensor disposed at the second surface of the base structure to measure a temperature of the second surface of the base structure; and a processor connected to the first temperature sensor and the second temperature sensor, and adapted to receive, from the first temperature sensor, the measured temperature of the external surface of the process vessel wall and to receive, from the second temperature sensor, the measured temperature of the second surface of the base structure, and to determine an internal process vessel wall temperature value as a function of the measured temperature of the external surface of the process vessel wall, the measured temperature of the second surface of the base structure, base structure parameters, and process vessel wall parameters, wherein the determined internal process vessel wall temperature value is a function of the measured temperature of the external surface of the process vessel and of a factor proportional to a difference between the measured temperature of the external surface of the process vessel and the measured temperature of the second surface of the base structure; wherein the factor is based on the base structure parameters and the process vessel wall parameters.

2. The assembly of claim 1, wherein the base structure parameters include a thermal conductivity value of the base structure and a thickness of the base structure between the first surface and the second surface.

3. The assembly of claim 2, wherein the process vessel wall parameters include a thickness of the process vessel wall and a thermal conductivity value of the process vessel wall.

4. The assembly of claim 3, wherein the base structure is a flat plate.

5. The assembly of claim 3, wherein the base structure is a curved plate and the process vessel wall parameters further include a radius of the process vessel wall.

6. The assembly of claim 5, wherein the base structure is a pipe clamp and the process vessel wall is a pipe.

7. A temperature measurement assembly for use with a process vessel wall, the assembly comprising: a temperature sensor assembly including: a base structure including: a first surface adapted to form a contact area with a portion of an external surface of a process vessel wall, and a second surface spaced from the first surface by a thickness of the base structure; a first temperature sensor extending through the base structure at the contact area to measure a temperature of the external surface of the process vessel wall; and a second temperature sensor at the second side of the base structure to measure a temperature of the second surface of the base structure; and an electronics housing connected to the temperature sensor assembly, the housing including: a processor connected to the first temperature sensor and the second temperature sensor, and adapted to receive, from the first temperature sensor, the measured temperature of the external surface of the process vessel wall and to receive, from the second temperature sensor, the measured temperature of the second surface of the base structure, and to determine an internal process vessel wall temperature value as a function of the measured temperature of the external surface of the process vessel wall, the measured temperature of the second surface of the base structure, base structure parameters, and process vessel wall parameters; and a communication interface to transmit the internal process vessel wall temperature value determined by the processor to a control or monitoring system, wherein the determined internal process vessel wall temperature value is a function of the measured temperature of the external surface of the process vessel and of a factor proportional to a difference between the measured temperature of the external surface of the process vessel and the measured temperature of the second surface of the base structure; wherein the factor is based on the base structure parameters and the process vessel wall parameters.

8. The assembly of claim 7, wherein the base structure parameters include a thermal conductivity value of the base structure and a thickness of the base structure between the first surface and the second surface.

9. The assembly of claim 8, wherein the process vessel wall parameters include a thickness of the process vessel wall and a thermal conductivity value of the process vessel wall.

10. The assembly of claim 9, wherein the base structure is a flat plate.

11. The assembly of claim 9, wherein the base structure is a curved plate and the process vessel wall parameters further include a radius of the process vessel wall.

12. The assembly of claim 11, wherein the base structure is a pipe clamp and the process vessel wall is a pipe.

13. The assembly of claim 7, wherein the communication interface includes circuitry for wireless transmission of the internal process vessel wall temperature value to the control or monitoring system.

14. The assembly of claim 7, wherein the housing further includes a local operator interface through which the process vessel wall parameters may be provided to the assembly.

15. The assembly of claim 14, wherein the base structure parameters may be provided to the assembly through the local operator interface.

16. A method of non-intrusively determining an internal process vessel wall temperature value, the method comprising: covering a portion of an external surface of a process vessel wall with a base structure; measuring a temperature of the external surface of the process vessel wall; measuring a temperature of a surface of the base structure, the surface facing away from the process vessel wall; and determining the internal process vessel wall temperature value based on the measured temperature of the external surface of the process vessel wall, the measured temperature of the surface of the base structure, base structure parameters, and process vessel wall parameters, wherein the determined internal process vessel wall temperature value is a function of the measured temperature of the external surface of the process vessel and of a factor proportional to a difference between the measured temperature of the external surface of the process vessel and the measured temperature of the second surface of the base structure; wherein the factor is based on the base structure parameters and the process vessel wall parameters.

17. The method of claim 16, wherein the base structure parameters include a thermal conductivity value of the base structure and a thickness of the base structure between the external surface of the process vessel wall and the surface of the base structure facing away from the process vessel wall.

18. The method of claim 17, wherein the process vessel wall parameters include a thickness of the process vessel wall and a thermal conductivity value of the process vessel wall.

19. The assembly of claim 18, wherein the base structure is a curved plate and the process vessel wall parameters further include a radius of the process vessel wall.

20. The assembly of claim 16, further including inputting at least one of a base structure parameter and a process vessel wall parameter into a processor for determining the internal process vessel wall temperature value.

21. The assembly of claim 16, wherein determining the internal process vessel wall temperature value includes employing a heat transfer model.

* * * * *